3,208,968
METAL COORDINATION COMPLEXES OF o-HYDROXYBENZALPHENYLHYDRAZONES AND SOLID POLYMERS STABILIZED THEREWITH

Henryk A. Cyba, Chicago, and Allen K. Sparks, Des Plaines, Ill., assignors, by direct and mesne assignments, of one-half to Universal Oil Products Company, Des Plaines, Ill., a corporation of Delaware, and one-half to Sun Oil Company, Philadelphia, Pa., a corporation of New Jersey
No Drawing. Filed Oct. 23, 1961, Ser. No. 147,062
13 Claims. (Cl. 260—45.75)

This invention relates to the stabilization of solid polymers and more particularly to a novel method of inhibiting deterioration of the solid polymer caused by oxidation and ultraviolet light.

It is well known that solid polymers undergo deterioration when exposed to sunlight and air. The deterioration due to sunlight and the deterioration due to oxygen are separate phenomena as evidenced by the fact that either one may occur in the absence of the other. It may be that deterioration from one source enhances the deterioration from the other source. In any event it is important that both forms of deterioration be inhibited, and the present invention provides a novel method for accomplishing this.

Recent advances in polymer technology have made available a large variety of solid polymers. In general the solid polymer is defined as a substance of high molecular weight, composed of repeating units and exhibiting unique physical properties including one or more of high tensile strength, elasticity, ability to form fibers, etc. The polymers may be classified into two general types as (1) condensation and (2) addition polymers. The condensation polymers may be formed from a single monomer or from different monomeric reactants. An addition polymer is derived from multiple condensation of an unsaturated monomer. Most, if not all, of the solid polymers undergo deterioration when exposed to sunlight and air, and such deterioration is inhibited in accordance with the present invention.

The present invention is particularly applicable to the stabilization of solid olefin polymers. These may comprise homopolymers or copolymers of olefinic hydrocarbons including particularly polyethylene, polypropylene and polybutylene, as well as copolymers of ethylene and propylene, ethylene and butylene and propylene and butylene. In addition, solid polymers prepared from one or more higher molecular weight olefins may be stabilized in accordance with the present invention.

Deterioration of the solid olefin polymers when exposed to sunlight is characterized in its early stages by the breaking of the polymer chain and the formation of carbonyl groups. As oxidation continues, the polymer cracks and loses tensile strength to the point of mechanical failure. For example, electrical insulation prepared from solid olefin polymers will undergo embrittlement, increase of power factor and loss of electrical resistance when used in exposed locations. Other examples of the use of solid olefin polymers subject to outdoor exposure are in the preparation of sheets which are used in draping open areas in building construction in order to protect the construction from the effect of weather and in the manufacture of light weight outdoor furniture, cover for greenhouses, awnings, etc. It is readily apparent that the fabricated product must be protected against deterioration caused both by sunlight and air.

The solid olefin polymer may be fabricated into any desired finished product, including moldings, fibers, films, sheets, tubing or other shapes.

Another solid polymer available commercially on a large scale is polystyrene. Polymerization of styrene proceeds rapidly in an emulsion of 5% sodium oleate solution and results in high molecular weight polymers. In another method styrene is polymerized in the presence of aluminum trialkyls. In general polystyrene is thermoplastic which, however, may be modified by effecting the polymerization in a small amount of divinylbenzene. The polystyrene type resins are particularly useful in the manufacture if molded or machine articles which find application in such goods as windows, optical goods, automobile panels, molded household articles, etc. One disadvantage of polystyrene is its tendency to deteriorate when exposed to air and direct sunlight for extended periods of time.

Another class of solid polymers available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to air and sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, etc.

Other solid polymers being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinyidine chloride and vinyl chloride), etc. Here again deterioration of the solid polymer occurs due to ultraviolet light and oxidation.

Still other solid polymers are prepared from other monomers and are available commercially. Illustrative examples of such other solid polymers include phenol-formaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale.

Rubber is composed of polymers of conjugated 1,3-dienes, either as polymers thereof or as copolymers thereof with other polymerizable components, and the rubbers, both natural and synthetic, are included as solid polymers in the present specification and claims. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include Hevea rubber, caoutchouc, balata, guttapercha, etc. It is well known that rubber undergoes deterioration due to oxygen and, when exposed to direct sunlight for extended periods of time, also undergoes deterioration from this source.

As hereinbefore set forth, the present invention is used to inhibit deterioration of solid polymers when exposed to oxygen and ultraviolet light. The solid polymer may be prepared in any suitable manner and in most cases will contain residual unsaturation. When the solid polymer undergoes deterioration by oxygen and/or ultraviolet light, such deterioration is inhibited in accordance with the present invention.

In one embodiment the present invention relates to a method of stabilizing solid polymer normally subject to deterioration by oxidation and ultraviolet light which comprises incorporating in said polymer a stabilizing concentration of a coordination complex of metal and o-hydroxybenzalphenylhydrazone inhibitor.

In another embodiment the present invention relates to solid polymer containing the inhibitor herein set forth.

It is believed that the coordination complex of the present invention is a novel composition of matter and accordingly is being so claimed in the present application.

The novel inhibitor of the present invention is a coordination complex of a metal and o-hydroxybenzalphenylhydrazone. Any suitable o-hydroxybenzalphenylhydrazone may be used in accordance with the present invention. In one method it is prepared by the reaction of phenylhydrazine with an o-hydroxybenzaldehyde. Phenylhydrazine may be obtained from any suitable source or may be prepared in any suitable manner. In one method phenylhydrazine is prepared by diazotization of aniline with sodium nitrite in hydrochloric acid solution at 32° F., reduction with sodium sulfite at 165° F., treatment with hydrochloric acid at 212° F. to destroy excess sulfite and decompose the sulfamic acid sodium salt, followed by liberation of the base with alkali.

The phenylhydrazine may contain substituents attached to the phenyl ring and, in a preferred embodiment, the substituent is attached in a position para to the hydrazine group although, in some cases, the substituent may be in the ortho or meta position, or two or more substituents may be attached to the phenyl ring. Conveniently the desired substitution is obtained by employing a substituted aniline as starting material for the diazotization reaction. In one embodiment the substituted aniline comprises p-methylaniline, p-ethylaniline, p-propylaniline, p-butylaniline, p-pentylaniline, p-hexylaniline, p-heptylaniline, p-octylaniline, p-nonylaniline, p-decylaniline, p-undecylaniline, p-dodecylaniline, p-tridecylaniline, p-tetradecylaniline, p-pentadecylaniline, p-hexadecylaniline, p-heptadecylaniline, p-octadecylaniline, p-nonadecylaniline, p-eicosylaniline, etc. Other substituted anilines include 2,4-dimethylaniline, 2-methyl-4-ethylaniline, 2-methyl-4-propylaniline, 2-methyl-4-butylaniline, 2-methyl-4-pentylaniline, 2-methyl-4-hexylaniline, 2-methyl-4-heptylaniline, 2-methyl-4-octylaniline, 2-methyl-4-nonylaniline, 2-methyl-4-decylaniline, 2-methyl-4-undecylaniline, 2-methyl-4-dodecylaniline, etc., 2,4-diethylaniline, 2-ethyl-4-methylaniline, 2-ethyl-4-propylaniline, 2-ethyl-4-butylaniline, 2-ethyl-4-pentylaniline, 2-ethyl-4-hexylaniline, etc., 2,4-dipropylaniline, 2-propyl-4-methylaniline, 2-propyl-4-ethylaniline, 2-propyl-4-butylaniline, 2-propyl-4-pentylaniline, 2-propyl-4-hexylaniline, etc., 2,4-dibutylaniline, 2-butyl-4-methylaniline, 2-butyl-4-ethylaniline, 2-butyl-4-propylaniline, 2-butyl-4-pentylaniline, 2-butyl-4-hexylaniline, etc., 2,4-diamylaniline, 2-amyl-4-methylaniline, 2-amyl-4-ethylaniline, 2-amyl-4-propylaniline, 2-amyl-4-butylaniline, 2-amyl-4-hexylaniline, 2-amyl-4-heptylaniline, 2-amyl-4-octylaniline, etc.

In another embodiment the substituent attached to the phenyl ring comprises an alkoxy group and preferably is selected from methoxy, ethoxy, propoxy, butoxy, pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, nonadecoxy, eicosoxy, etc. Here again the alkoxy substituent preferably is in the para position, or may comprise one of more alkoxy groups and/or one or more alkyl groups, each group preferably being selected from those specifically set forth hereinabove.

In another embodiment the substituent attached to the phenyl ring comprises a cyclic substituent. For example, when the cyclic substituent is phenyl the substituted aniline comprises alpha-naphthylamine, beta-naphthylamine, etc., which also may contain hydrocarbon, alkoxy, arloxy or other suitable substituents. In still another embodiment the substituent comprises an ether, thioether or amino group as illustrated, for example, by compounds as p-phenoxyaniline, p-toloxyaniline, p-xyloxyaniline, p-ethylphenoxyaniline, p-propylphenoxyaniline, etc., p-benzyloxyaniline, p-methylbenzyloxyaniline, p-dimethylbenzyloxyaniline, p-ethylbenzloxyaniline, p-diethylbenzyloxyaniline, p-propylbenzyloxyaniline, etc., p-phenylthioxoaniline, p-tolythioxoaniline, p-xylylthioxoaniline, p-ethylphenylthioxoaniline, p-diethylphenylthioxoaniline, p-propylphenylthioxoaniline, etc., p-phenylaminoaniline, p-tolyaminoaniline, p - xylylaminoaniline, p-ethylphenylaminoaniline, p - diethylphenylaminoaniline, p - propylphenylaminoaniline, etc. In the above specific compounds, the para position refers to the position of the substituent group in relation to the amino group of the aniline. It is understood that the substituent may be in the position ortho or meta and that two or more of a substituent selected from those specifically set forth may be positioned on the aniline ring. Also, it is understood that the alkyl substituents hereinbefore set forth are illustrative groups containing up to three carbon atoms each and that these may be replaced by alkyl groups containing up to twenty or more carbon atoms each.

In still another embodiment the substituent may contain a halogen, and preferably chlorine or bromine, a nitro group and/or a carboxylic acid ester group. It is understood that the substituted anilines hereinbefore set forth are illustrative and not limiting and that any suitable substituted aniline may be used in accordance with the present invention.

As hereinbefore set forth, the phenylhydrazine is reacted with an o-hydroxybenzaldehyde. In one embodiment salicylaldehyde is used as a reactant. In another embodiment a substituted o-hydroxybenzaldehyde is employed including particularly orthovanillin (2-hydroxy-3-methoxybenzaldehyde). Other substituted o-hydroxybenzaldehydes include 2-hydroxy-3-methylbenzaldehyde, 2-hydroxy-3-ethylbenzaldehyde, 2-hydroxy-3-propylbenzaldehyde, 2-hydroxy-3-butylbenzaldehyde, 2-hydroxy-3-pentylbenzaldehyde, 2-hydroxy-3-hexylbenzaldehyde, 2-hydroxy-3-heptylbenzaldehyde, 2-hydroxy-3-octylbenzaldehyde, 2-hydroxy-3-nonylbenzaldehyde, 2-hydroxy-3-decylbenzaldehyde, 2-hydroxy-3-undecylbenzaldehyde, 2-hydroxy-3-dodecylbenzaldehyde, 2-hydroxy-3-tridecylbenzaldehyde, 2-hydroxy-3-tetradecylbenzaldehyde, 2-hydroxy-3-pentadecylbenzaldehyde, 2-hydroxy-3-hexadecylbenzaldehyde, 2-hydroxy-3-heptadecylbenzaldehyde, 2-hydroxy-3-octadecylbenzaldehyde, 2-hydroxy-3-nonadecylbenzaldehyde, 2-hydroxy-3-eicosylbenzaldehyde, etc., 2-hydroxy - 3-ethoxybenzaldehyde, 2-hydroxy-3-propoxybenzaldehyde, 2-hydroxy-3-butoxybenzaldehyde, 2-hydroxy-3-pentoxybenzaldehyde, 2-hydroxy-3-hexoxybenzaldehyde, 2-hydroxy-3-heptoxybenzaldehyde, 2-hydroxy-3-octoxybenzaldehyde, 2-hydroxy-3-nonoxybenzaldehyde, 2-hydroxy-3-decoxybenzaldehyde, 2-hydroxy-3-undecoxybenzaldehyde, 2-hydroxy-3-dodecoxybenzaldehyde, 2-hydroxy-3-tridecoxybenzaldehyde, 2-hydroxy-3-tetradecoxybenzaldehyde, 2-hydroxy-3-pentadecoxybenzaldehyde, 2-hydroxy-3-hexadecoxybenzaldehyde, 2-hydroxy-3-heptadecoxybenzaldehyde, 2 - hydroxy-3-octadecoxybenzaldehyde, 2-hydroxy-3-nonadecoxybenzaldehyde, 2-hydroxy-3-eicosoxybenzaldehyde, etc.

The alkyl and/or alkoxy substituents hereinbefore set forth are generally preferred in one embodiment of the invention. However, it is understood that the alkyl or alkoxy substituent may be positioned in the 4, 5 or 6 position on the phenyl ring and that two or more substituents may be attached to the phenyl ring. In another embodiment, in addition to or in place of the alkyl and/or alkoxy groups, other substituents may be attached to the phenyl ring of the benzaldehyde and such substituents may comprise cyclic, cyclic-oxy, cyclic-thioxy or cyclic-amino substitutes, and/or may contain halogen and particularly chlorine or bromine, a nitro group, and/or a carboxylic acid ester group, as specifically hereinbefore set forth in the description of the substituted aniline.

The reaction of the phenylhydrazine with the o-hydroxybenzaldehyde is effected in any suitable manner.

In one method the phenylhydrazine is comingled with the o-hydroxybenzaldehyde at room temperature with stirring or the reaction is effected under refluxing conditions. For ease in handling, the phenylhydrazine and the o-hydroxybenzaldehyde are prepared as separate solutions in a suitable solvent including alcohol and particularly methanol, ethanol, propanol, butanol, ether, benzene, toluene, etc. The o-hydroxybenzalphenylhydrazone precipitates as crystals and then is reacted with a suitable compound of metal to form the coordination complex.

Particularly preferred metals are nickel, copper and cobalt. Other metals include antimony, cadmium, lead, tin, uranium ($UO_2$), vanadium and zinc. Any suitable metal compound may be used in preparing the coordination complex. A preferred compound of nickel is nickel acetate tetrahydrate. Other soluble salts of nickel may be used. Other nickel salts include nickel bromide trihydrate, nickel carbonyl, nickel chloride hexahydrate, nickel formate, nickel nitrate hexahydrate, nickel sulfate hexahydrate, etc. A preferred copper compound is cupric acetate hydrate. Other soluble salts of copper include cupric bromide, cupric butyrate, cupric chloride dihydrate, cupric acetoacetate, cupric formate, cupric nitrate trihydrate, cupric nitrate hexahydrate, cupric salicylate, etc. A preferred compound of cobalt is cobaltous sulfate monohydrate. Other soluble compounds of cobalt include cobaltous acetate, cobaltous bromide, cobaltous chloride, cobaltous iodide, cobaltous nitrate, etc.

Soluble compounds of cadmium include cadmium acetate trihydrate, cadmium chloride hydrate, cadmium formate, cadmium nitrate tetrahydrate, cadmium salicylate hydrate, etc. Soluble salts of lead include lead acetate, lead caprate, lead caproate, etc. Soluble compounds of tin include stannous chloride dihydrate, stannic sulfate dihydrate, stannous tartrate, etc. Soluble compounds of zinc include zinc acetate, zinc bromide, zinc chloride, zinc iodide, zinc nitrate, zinc salicylate, etc.

In another embodiment any valences of the metal in excess of 2 may be satisfied by other groups including hydrocarbon, hydroxy, alkoxy, halogen, etc. For example, the tin compound used in forming the coordination complex may comprise dialkyl tin compounds such as dimethyl tin dichloride, dilauryl tin dichloride, diphenyl tin dichloride, dibenzyl tin dichloride, phenyl tin trichloride, tributyl tin chloride, triphenyl tin chloride, tribenzyl tin chloride, divinyl tin dichloride, diacetoxy tin dichloride, triacetoxy tin chloride, etc. Suitable similarly substituted compounds of other metals may be employed.

The o-hydroxybenzalphenylhydrazone is reacted with the metal compound in any suitable manner. For example, o-vanillalphenylhydrazone in alcoholic solution is refluxed with nickel acetate tetrahydrate in alcoholic solution and alkali metal hydroxide alcoholic solution. When desired, the reaction may be effected at a lower temperature which generally is not below room temperature. As mentioned above, any suitable soluble salt of the metal may be employed and any suitable solvent may be used. Preferred alkali metal hydroxides comprise sodium hydroxide and potassium hydroxide, although other alkali metal hydroxide solutions may be used.

It is understood that a number of different coordination complexes may be prepared and used in accordance with the present invention and that all of these are not necessarily equivalent in the same or different solid polymer.

The coordination complex inhibitor of the present invention is incorporated in the solid polymer in a stabilizing concentration, which may range from about 0.05% to about 10% by weight and preferably from about 0.5% about 2% by weight of the solid polymer. The inhibitor may be incorporated in the polymer in any suitable manner and at any suitable stage of preparation. Because the inhibitor may inhibit polymerization of the monomer, it generally is preferred to incorporate the inhibitor after the solid polymer is formed. In one method the solid polymer is recovered as powder, pellets, cylinders, spheres, sheets, rolls, bars, etc., and these may be comingled with the inhibitor in any suitable manner such as by partly melting the solid polymer and adding the inhibitor to the hot melt. This is readily accomplished, for example, by heating the solid polymer on a steam heated two-roll mill of conventional commercial design and adding the inhibitor during this operation. The solid polymer containing the inhibitor is recovered in sheet form and may be fabricated in any desired manner. In another method the inhibitor is added in a Banbury mixer, etc., an extruder or in any other suitable manner. When fibers are desired, the inhibited polymer is recovered from the Banbury mixer and is extruded through a spinneret.

The inhibitor is utilized as such or is prepared as a solution in a suitable solvent including alcohols, and particularly methanol, ethanol, propanol, butanol, etc., hydrocarbons and particularly benzene, toluene, xylenes, cumene, etc. However, the solvent must not be detrimental to the polymer plastic and, therefore, a preferred solvent comprises the same solvent used during the manufacture or working of the polymer. It is understood that the inhibitor also may be used along with other additives incorporated in polymer plastics for various purposes. For example, in colored plastics carbon black is used in a concentration of below about 5% by weight and generally of from about 1% to about 3% by weight. Similarly, pigments, zinc oxide, titanium oxide, etc. may be incorporated in polymer plastics, the oxides usually being employed in a concentration of from about 2% to about 10% by weight. In many cases, silicates, dyes and/or fillers also are incorporated in the polymer.

It is understood that the inhibitor of the present invention also may be used along with other inhibitors or other ultraviolet light stabilizers. The other inhibitors generally will be of the phenolic or amine type and may include phenyl-alpha-naphthylamine, phenyl-beta-naphthylamine, phenothiazine, dialkylated phenols, trialkylated phenols, diphenyl-p-phenylenediamine, dinaphthyl-p-phenylenediamine, salol (salicylic acid esters), p-octylphenylsalicylate, various phosgene alkylatedphenol reaction products as various alkoxyalkyldihydroxybenzophenones, polyalkyldihydroxybenzophenones, tetrahydroxybenzophenones, etc. Other ultraviolet light stabilizers include nickel-bis-dithiocarbonates, nickel-bis - dihydroxypolyalkylphenol sulfides, dilauryl-β-mercaptodipropionate, dihydroxytetraalkyl sulfides, dihydroxytetraalkyl methanes, etc. Various trithiophosphites as trilaurylphosphite, hexalkylphosphonic acid, trialkylphosphites, etc.

The following examples are introduced to illustrate further the novelty and utility of the present invention but not with the intention of unduly limiting the same.

EXAMPLE I

The coordination complex inhibitor of this example is copper bis-salicylalphenylhydrazone and was prepared by refluxing salicylalphenylhydrazone, copper acetate hydrate and potassium hydroxide. The reaction mixture was filtered hot, washed with warm water, digested with hot methanol, filtered, washed with warm methanol and dried. Copper bis-salicylalphenylhydrazone was recovered as brown crystals.

Copper bis-salicylalphenylhydrazone, prepared in the above manner, was evaluated as an inhibitor in polypropylene, available commercially from Montecatini under the trade name of "Moplen."

The polypropylene of this example was evaluated in three different standard methods. In one method the samples of the polypropylene, with and without inhibitor, were evaluated in an Atlas type DL-TS Weather-Ometer. The Weather-Ometer may be operated with or without the use of water sprays to simulate accelerated moist weathering. In the present runs, the water sprays were not used, thereby simulating and accelerating the effect of hot airy weathering, a much more severe condition. Polypropylene pellets were milled in a two-roll heated mill of conventional commercial design and the inhibitor incorporated in the samples during the milling. The samples were pressed into sheets of 17 mil. thickness and cut into plaques of 1⅜" x 1½". The plaques then were inserted into plastic holders, affixed onto a rotating drum and exposed to carbon arc rays at about 125° F. in the Weather-Ometer. Periodically samples of the polypropylene were subjected to infrared analysis and the carbonyl band at 1715 cm.$^{-1}$ was determined. As hereinbefore set forth, the formation of carbonyl groups is an indication of deterioration of the polyolefin. The higher intensity of the carbonyl band indicates a higher carbonyl concentration and accordingly increased deterioration.

Samples of the polypropylene also were evaluated by outdoor exposure. The plaques of polyolefin prepared in the above manner were exposed to weathering on a rack placed outdoors at Des Plaines, Illinois. Here again, the samples were analyzed for carbonyl formation in the manner described in the previous paragraph.

From the data in the above table it will be seen that the polypropylene without inhibitor developed a carbonyl content of over 900 in 48 hours in the Weather-Ometer. The sample was brittle and broke into pieces. The carbonyl content was over 1000 in 28 days of outdoor exposure. In contrast, the polyolefin containing 1% copper bis-salicylalphenylhydrazone developed a carbonyl content of only 221 in 288 hours in the Weather-Ometer and only 206 in 28 days of outdoor exposure.

EXAMPLE II

Copper bis-salicylalphenylhydrazone also was evaluated in solid polyethylene. The polyethylene used in this example is a linear polyethylene of high density and marketed under the trade name of "Fortiflex H.D.C.$_2$" by the Celanese Corporation of America. These evaluations were made in the same manner as described in Example I and the results are reported in the following table:

*Table II*

| Additive | Weather-Ometer | | | | | | | | Outdoor Exposure | | | | | |
|---|---|---|---|---|---|---|---|---|---|---|---|---|---|---|
| | Carbonyl Content, Hours | | | | | | | | Carbonyl Content, Days | | | | | |
| | 0 | 48 | 96 | 144 | 192 | 240 | 288 | 336 | 0 | 14 | 28 | 42 | 56 | 70 |
| None | 22 | 143 | 404 | 622 | 810 | Brittle | | | 24 | 76 | 142 | 199 | 259 | 348 |
| 0.075% by weight of copper bis-salicylalphenylhydrazone | 35 | 51 | 58 | 71 | 79 | 82 | 101 | | 34 | 51 | 58 | 69 | 65 | 86 |
| 2% by weight of copper bis-salicylalphenylhydrazone | 48 | 67 | 74 | 76 | 74 | 78 | 80 | 86 | 48 | 62 | 60 | | | |

Samples of the polypropylene also were evaluated by a thermal oxidation method. This method is described in a paper by W. L. Hawkins et al. of the Bell Telephone Laboratories, Inc., entitled "The Effect of Carbon Black on Thermal Antioxidants for Polyethylene," which paper appeared in the Journal of Applied Polymer Science, vol. 1, issue 1, pages 21–42 (1949). The method used in this test was modified in that an electrically heated aluminum block rather than an oven was used to maintain the desired temperature and the oxygen absorption of the sample was determined manometrically rather than volumetrically. In this method samples of the polypropylene, weighing about 0.5 g. each, were placed in separate 8 ml. glass tubes and the tubes then were inserted into horizontal rows of openings located concentrically around the heater. The temperature is maintained at about 285° F. The glass tubing also was packed with glass wool and molecular sieves to absorb the gases. Each of the glass tubes is connected to individual manometers containing mercury and the differential pressure is periodically determined. The Induction Period is taken as the number of hours required to reach a differential pressure of 20 cm. Hg.

The results of evaluations in the Weather-Ometer and outdoor exposure are reported in the following table for a sample of the Moplen polypropylene with no added inhibitor and for a sample containing 1% by weight of copper bis-salicylalphenylhydrazone.

Here again it will be noted that the coordination complex inhibitor of the present invention served to considerably reduce carbonyl formation.

EXAMPLE III

The coordination complex inhibitor of this example is Ni-bis-o-vanillalphenylhydrazone and was prepared by reacting o-vanillalphenylhydrazone with nickelous acetate. o-Vanillalphenylhydrazone was prepared by refluxing 152 g. (1 mol) of o-vanillin dissolved in 100 g. of formula "30" alcohol and 108 g. (1 mol) of phenylhydrazine dissolved in 300 g. of formula "30" alcohol. The product was vacuum filtered and washed at room temperature with formula "30" alcohol. o-Vanillalphenylhydrazone was recovered as the precipitate. 30.1 g. (0.125 mol) of the o-vanillalphenylhydrazone was refluxed with 8.12 g. of potassium hydroxide in 100 g. of methanol. A solution of 15.5 g. (0.0625 mol) of nickelous acetate was dissolved in 200 g. of methanol and this solution was added step-wise to the refluxing o-vanillalphenylhydrazone. Nickel bis-o-vanillalphenylhydrazone was recovered as a precipitate in a 90% by weight yield. The product was analyzed and found to contain 10.6% by weight of nickel which corresponds to the theoretical nickel content of 10.7% by weight.

Nickel bis-o-vanillalphenylhydrazone, prepared in the

*Table I*

| Additive | Weather-Ometer | | | | | | | Outdoor Exposure | | |
|---|---|---|---|---|---|---|---|---|---|---|
| | Carbonyl Content, Hours | | | | | | | Carbonyl Content, Days | | |
| | 0 | 48 | 96 | 144 | 192 | 240 | 288 | 0 | 14 | 28 |
| None | 101 | 951 | Brittle—Broken | | | | | 166 | 520 | 1000+ |
| 1% by weight of copper bis-salicylalphenylhydrazone | 182 | 176 | 190 | 200 | 195 | 260 | 221 | 191 | 184 | 206 | above manner, was evaluated in "Moplen" polypropylene in the same manner as described in Example I. For comparative purposes the evaluations of a sample of the polypropylene without inhibitor are repeated in the table.

Table III

| Additive | Weather-Ometer Carbonyl Content, Hours | | | | | | Outdoor Exposure Carbonyl Content, Days | | |
|---|---|---|---|---|---|---|---|---|---|
| | 0 | 48 | 96 | 144 | 192 | 240 | 0 | 14 | 28 |
| None | 161 | 951 | Brittle—Broken | | | | 166 | 520 | 1000+ |
| 1% by weight of nickel bis-o-vanillalphenylhydrazone | 133 | 150 | 179 | 194 | 229 | 309 | 132 | 168 | 198 |

Again it is seen that the coordination complex inhibitor of the present invention was effective in reducing carbonyl formation in the solid polymer.

EXAMPLE IV

Nickel bis-o-vanillalphenylhydrazone, prepared as described in Example III, also was evaluated in solid polyethylene. The solid polyethylene is "Fortiflex H.D.C.$_2$" which also was used in the evaluations reported in Example II. Again for comparative purposes, the evaluations of the uninhibited polyethylene are repeated in the following table.

Table IV

| Additive | Weather-Ometer Carbonyl Content, Hours | | | | | | | | Outdoor Exposure Carbonyl Content, Days | | | | | | Induction Period, Hours |
|---|---|---|---|---|---|---|---|---|---|---|---|---|---|---|---|
| | 0 | 48 | 96 | 144 | 192 | 240 | 288 | 336 | 0 | 14 | 28 | 42 | 56 | 70 | |
| None | 22 | 143 | 404 | 622 | 810 | Brittle | | | 24 | 76 | 142 | 199 | 259 | 348 | 11 |
| 0.075% by weight of nickel bis-o-vanillalphenylhydrazone | 29 | 34 | 29 | 48 | 56 | 72 | 92 | 119 | 30 | 39 | 62 | 74 | 72 | 90 | 128 |
| 2% by weight of nickel bis-o-vanillalphenylhydrazone | 24 | 23 | 28 | 22 | 32 | 33 | 34 | 35 | 26 | 38 | 33 | | | | |

Again it will be noted that the coordination complex inhibitor of the present invention was very effective in reducing carbonyl formation as evaluated both in the Weather-Ometer and by outdoor exposure. Also noteworthy is the increase in the induction period from 11 for the uninhibited sample to 128 for the inhibited sample.

EXAMPLE V

The coordination complex inhibitor of this example is copper bis-o-vanillalphenylhydrazone and was prepared by the reaction of o-vanillalphenylhydrazone with cupric acetate hydrate. The o-vanillalphenylhydrazone was prepared in substantially the same manner as described in Example III. The cupric acetate was added step-wise to the refluxing solution of o-vanillalphenylhydrazone, and copper bis-o-vanillalphenylhydrazone was recovered as a chocolate colored precipitate.

Copper bis-o-vanillalphenylhydrazone, prepared in the above manner, was evaluated in "Fortiflex H.D.C.$_2$" solid polyethylene. These evaluations were made in the same manner as described in Example II and the results are reported in the following table. For comparative purpose the evaluations of the polyethylene without the inhibitor also are repeated in the table.

Table V

| Additive | Weather-Ometer Carbonyl Content, Hours | | | | | | | | Outdoor Exposure Carbonyl Content, Days | | | | | | Induction Period, Hours |
|---|---|---|---|---|---|---|---|---|---|---|---|---|---|---|---|
| | 0 | 48 | 96 | 144 | 192 | 240 | 288 | 384 | 0 | 14 | 28 | 42 | 56 | 70 | |
| None | 22 | 143 | 404 | 622 | 810 | Brittle | | | 24 | 76 | 142 | 199 | 259 | 348 | 11 |
| 0.075% by weight of copper bis-o-vanillalphenylhydrazone | 31 | 48 | 56 | 62 | 67 | 72 | 77 | 93 | 33 | 48 | 66 | 75 | 68 | 90 | 69 |
| 2% by weight of copper bis-o-vanillalphenylhydrazone | 44 | 44 | 53 | 50 | 56 | | | | 45 | 52 | 42 | | | | |

Again it is noted that the coordination complex of the inhibitor of the present invention was very effective in inhibiting carbonyl formation and in increasing the induction period of the solid polyethylene.

EXAMPLE VI

Copper bis-salicylalphenylhydrazone is utilized as an inhibitor in solid polybutylene. The inhibitor is incorporated by hot melt addition of the inhibitor to the polybutylene being heated and pressed on a conventional two-roll steam heated mill. The polybutylene sheets then are heat compressed to a thickness of 20 mils, cut into plaques of 1½" x 1½" and mounted in plastic holders. The plaques are evaluated both in the Weather-Ometer and by outdoor exposure in the manner hereinbefore described in detail. The induction period of the samples of polybutylene are obtained in the thermal oxidation method heretofore described. From these evaluations, it will be seen that copper bis-salicylalphenylhydrazone serves to effectively inhibit carbonyl development and to considerably increase the induction period of the polybutylene.

EXAMPLE VII

The coordination complex of this example is cobalt bis-allylsalicylalphenylhydrazone and is prepared as follows. 41 g. (0.25 mol) of allylsalicylaldehyde in 200 g. of benzene are refluxed with 26 g. (0.25 mol) of phenyl hydrazine. 4.4 cc. of water is collected which corresponds to the theoretical amount of water to be liberated of 4.5 cc. 58 g. yield of 3-allylsalicylalphenylhydrazone is recovered. 1 mol proportion of the allylsalicylalphenylhydrazone, prepared in the above manner, is refluxed with 0.5 mol proportion of cobaltous sulfate monohydrate in 200 g. of water and a methanolic solution of potassium hydroxide. Cobalt bis-allylsalicylalphenylhydrazone is recovered as a gray-green precipitate and is washed with hot water and methanol to remove unreacted materials.

Cobalt bis-allylsalicylalphenylhydrazone is incorporated in polystyrene by partly melting the polystyrene and incorporating the inhibitor in the hot melt in a concentration of 0.5% by weight. The polystyrene containing inhibitor is of improved resistance to oxidative deterioration and to the effect of ultraviolet light.

EXAMPLE VIII

The coordination complex inhibitor of this example is nickel bis-salicylaldodecylphenylhydrazone. It is prepared in the following manner. Dodecylphenylhydrazine is prepared by diazotization of dodecylaniline with sodium nitrite in hydrochloric acid solution at 32° F., reduction with sodium sulfite at 165° F., treatment with hydrochloric acid at 212° F. to destroy excess sulfite and decompose the sulfamic acid sodium salt, followed by liberation of the base with alkali. Dodecylphenylhydrazine is refluxed with salicylaldehyde to prepare salicylaldodecylphenylhydrazone which then is refluxed with nickel acetate tetrahydrate to form nickel bis-salicylaldodecylphenylhydrazone.

Nickel bis-salicylaldodecylphenylhydrazone is used as an inhibitor in polyvinyl chloride plastic. Here again the inhibitor is incorporated by partly melting the polyvinyl chloride plastic and incorporating the inhibitor in the hot metal. The inhibitor is used in a concentration of 1% by weight, and the inhibited polyvinyl chloride plastic is of increased resistance to oxidative and ultraviolet light deterioration.

EXAMPLE IX

The coordination complex inhibitor of this example is zinc bis-o-vanillal-p-heptadecoxyphenylhydrazone. It is prepared by diazotization of p-heptadecoxyaniline with sodium nitrite, then refluxing with o-vanillin and finally refluxing with zinc acetate dihydrate and potassium hydroxide. Zinc bis-o-vanillal-p-decoxyphenylhydrazone is recovered by filtering and then is washed and dried.

Zinc bis-o-vanillal-p-heptadecoxyphenylhydrazone is incorporated in a concentration of 0.5% in nylon. The inhibitor is incorporated in a Banbury mixer and the nylon is formed into fibers in a spinneret. The resultant nylon containing the inhibitor is of improved resistance to air and ultraviolet light.

EXAMPLE X

Nickel bis-salicylalphenylhyrazone, prepared as described in Example I, is used as inhibitor in elastomers. The elastomer of this example is SBR rubber and the inhibitor, in a concentration of 2% by weight, is incorporated therein during the final stages of processing in the Banbury mixer. Incorporation of the inhibitor serves to inhibit deterioration of the rubber due to air and ultraviolet light.

We claim as our invention:

1. Solid polymer normally subject to deterioration by oxidation and ultraviolet light containing, as an inhibitor against said deterioration, a stabilizing concentration of a coordination complex of an o-hydroxybenzalphenylhydrazone and a metal selected from the group consisting of nickel, copper, cobalt and zinc.
2. The composition of claim 1 further characterized in that said solid polymer is an olefin polymer.
3. The composition of claim 1 wherein said coordination complex is nickel bis-salicylalphenylhydrazone.
4. The composition of claim 1 wherein said coordination complex is copper bis-salicylalphenylhydrazone.
5. The composition of claim 1 wherein said coordination complex is nickel bis-o-vanillalphenylhydrazone.
6. The composition of claim 1 wherein said coordination complex is copper bis-o-vanillalphenylhydrazone.
7. The composition of claim 1 wherein said coordination complex is cobalt bis-allylsalicylalphenylhydrazone.
8. A coordination complex of an o-hydroxybenzalphenylhydrazone and a metal selected from the group consisting of nickel, copper, cobalt and zinc.
9. Copper bis-salicylalphenylhydrazone.
10. Copper bis-o-vanillalphenylhydrazone.
11. Nickel bis-o-vanillalphenylhydrazone.
12. Nickel bis-salicylalphenylhydrazone.
13. Cobalt bis-allylsalicylalphenylhydrazone.

References Cited by the Examiner

UNITED STATES PATENTS

| | | | |
|---|---|---|---|
| 2,665,265 | 1/54 | Burgess | 260—45.75 |
| 2,877,252 | 3/59 | Hein et al. | 260—429 |

LEON J. BERCOVITZ, *Primary Examiner.*

MILTON STERMAN, *Examiner.*